United States Patent
Heitz et al.

(10) Patent No.: US 7,396,309 B2
(45) Date of Patent: Jul. 8, 2008

(54) SPLIT POWER TRANSMISSION TO INCLUDE A VARIABLE DRIVE

(75) Inventors: Uwe Heitz, Markdorf (DE); Gabor Diosi, Friedrichshafen (DE); Jürgen Wafzig, Eriskirch (DE); Gerhard Gumpoltsberger, Friedrichshafen (DE); Bernd Vahlensieck, Markdorf (DE); Pedro Casals, Tettnang-Kau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 245 days.

(21) Appl. No.: 11/443,463

(22) Filed: May 30, 2006

(65) Prior Publication Data

US 2006/0270507 A1 Nov. 30, 2006

(30) Foreign Application Priority Data

May 31, 2005 (DE) .................... 10 2005 024 738

(51) Int. Cl.
*F16H 37/02* (2006.01)

(52) U.S. Cl. ...................... 475/215; 475/216

(58) Field of Classification Search ............ 475/207, 475/209, 210, 211, 214, 215, 216, 217
See application file for complete search history.

(56) References Cited

U.S. PATENT DOCUMENTS 6,155,951 A 12/2000 Kuhn et al.
6,726,590 B2 4/2004 Henzler et al.
2005/0075209 A1* 4/2005 Wafzig et al. ............... 475/219

FOREIGN PATENT DOCUMENTS

| DE | 196 29 213 A1 | 1/1998 |
|---|---|---|
| DE | 197 03 544 A1 | 8/1998 |
| DE | 100 43 623 A1 | 3/2002 |
| EP | 1 253 350 A2 | 10/2002 |

* cited by examiner

*Primary Examiner*—Roger Pang
*Assistant Examiner*—Edwin A Young
(74) *Attorney, Agent, or Firm*—Davis Bujold & Daniels, P.L.L.C.

(57) ABSTRACT

A split power transmission with a variable drive, a brake, a clutch, an integrating transmission containing a planetary set, the internal gear forming the output of the transmission, and an additional planetary set located between the drive shaft and the transmission. A portion of the transmission drive shaft power is transferable to the transmission which includes a secondary shaft located axially parallel to the variable drive. The power of the variable drive is directed towards the integrating transmission via the secondary shaft by using a defined transmission ratio. Torque division in the low cruising range and is achieved by locking the brake connecting the internal gear of the planetary set located between the drive shaft, and the transmission to the unit. Whereas in the high cruising range, by engaging the clutch the sun gear of the transmission is interlocked with the internal gear of the transmission.

9 Claims, 1 Drawing Sheet

SPLIT POWER TRANSMISSION TO INCLUDE A VARIABLE DRIVE

This application claims priority from German Application Serial No. 10 2005 024738.5 filed May 31, 2005.

FIELD OF THE INVENTION

The present invention involves a split power transmission that includes a variable drive.

BACKGROUND OF THE INVENTION

Normally, such transmission units include variable drives with continuously adjustable friction wheels that contain at least two toroidal disks and a toroidal running surface with rolls moving between the disks and running surface. Besides the continuously adjustable change in gears, variable drives with friction wheels exhibit a high torque capacity.

DE 196 29 213 A1 describes a transmission that can be operated in two different ranges of performance. The main components of these well-known friction wheel transmissions are a continuously adjustable variable drive with friction wheels and two paired interacting toroidal running surfaces, a secondary shaft, and an integrating transmission. Split power is provided for in the low cruising range (LOW). The drive power is conducted from the drive shaft through a transmission stage to the secondary shaft and on to the continuously adjustable transmission (variable drive with friction wheel). On the power take-off side, it is connected to the integrating transmission. A second power branch will conduct the drive power, via a secondary shaft, and a transmission stage directly into the integrating transmission. The power of both branches will then be combined and transferred to the output shaft.

In the second range of performance (HIGH) of this well-known transmission, the drive power will be transmitted through a transmission stage to the secondary shaft and subsequently to the continuously adjustable transmission. There is no additional power provided in this case.

Another transmission unit is described in the Applicant's DE 197 03 544 A1. It provides for split power and uses a continuously adjustable transmission unit, in particular a transmission unit consisting of interacting toroidal running surfaces (friction wheel transmission) paired together. This well-known transmission unit, too, includes an intermediate shaft and/or secondary shaft in order to achieve the desired split power.

A split power, dual area, transmission unit, as described above, is contained in EP 1 253 350 A2. To increase overall effectiveness, a gear is engaged in overdrive, because a variable drive, in general, shows less effectiveness than the application of a positive power or torque transmission device. Here, the transmission includes a double-tension, toroidal variable drive, an integrating transmission containing a planetary set and a planetary set used as a reverse transmission. All units are arranged in the direction of the power flow.

Furthermore, there is a transmission unit described in the Applicant's DE 100 43 623 A1. This unit consists of a drive shaft, at least one output shaft, and a configuration that allows for a change in the transmission ratio between the drive shaft and the output shaft by connecting the drive shaft with a startup unit that is connected to a continuously adjustable transmission. Furthermore, the continuously adjustable transmission is connected to a transfer gearbox, which contains a drive shaft for rear wheel drive operation and a second drive shaft for front wheel drive operation. Provisions can be made that the transmission unit is constructed as a two-zone transmission designed as a geared neutral transmission unit. In this well-known transmission, in order to shift to HIGH, the sun gear will interlock with the internal gear of an integrating transmission used as a planetary set which has the disadvantage of creating a high coupling torque.

The purpose of the present invention is to specify a split power transmission including a variable drive that will avoid high coupling torque in the upper cruising range. Furthermore, production of the invented transmission must be cost effective and utilize as little installation space as possible.

SUMMARY OF THE INVENTION

Thus, the following will be proposed: a split power transmission, to include a variable drive, a brake and a clutch, an integrating transmission containing a planetary set, an additional planetary set located in the direction of the power flow between the drive shaft and the integrating transmission, of which a portion of the transmission drive shaft power is transferable to the integrating transmission which includes a secondary shaft located axially parallel to the variable drive. The variable drive power is directed to the integrating transmission, via the secondary shaft, by using a defined transmission ratio. Torque division will be provided in the low cruising range (LOW) and will be achieved by locking the brake that connects the internal gear of the planetary set located between the drive shaft and the integrating transmission with the unit, but is detachable. According to this invention, by engaging the clutch, the sun gear of the integrating transmission will be interlocked with the internal gear of the integrating transmission in the high cruising range (HIGH).

Preferably, the planetary sets will be constructed as minus-planetary sets. Furthermore, in order to generate a variable drive power transmission ratio in the direction of the power flow between the variable drive output and the integrating transmission, provisions can be made for either two spur-gear levels, preferably with a total of five spur-gears or a chain wheel drive and a pair of spur-gear levels, each of which will be positioned in the direction of the power flow before and after the secondary shaft.

As per this invention, the transmission is designed as a particularly advantageous embodiment of a geared neutral transmission (finite input speed during stagnant output will be possible thus eliminating the necessity for a reversing unit and an additional shifting device for the reverse gear, as the continuously adjustable transmission will perform the shifting between forward and reverse gear. The design of the geared neutral transmission conveniently eliminates an additional starting gear.

The variable drive will be designed preferably as a wrapped variable drive or a variable drive with friction wheels.

BRIEF DESCRIPTION OF THE DRAWINGS

The invention will now be described, by way of example, with reference to the accompanying drawings in which.

DETAILED DESCRIPTION OF THE INVENTION

Figure 1:
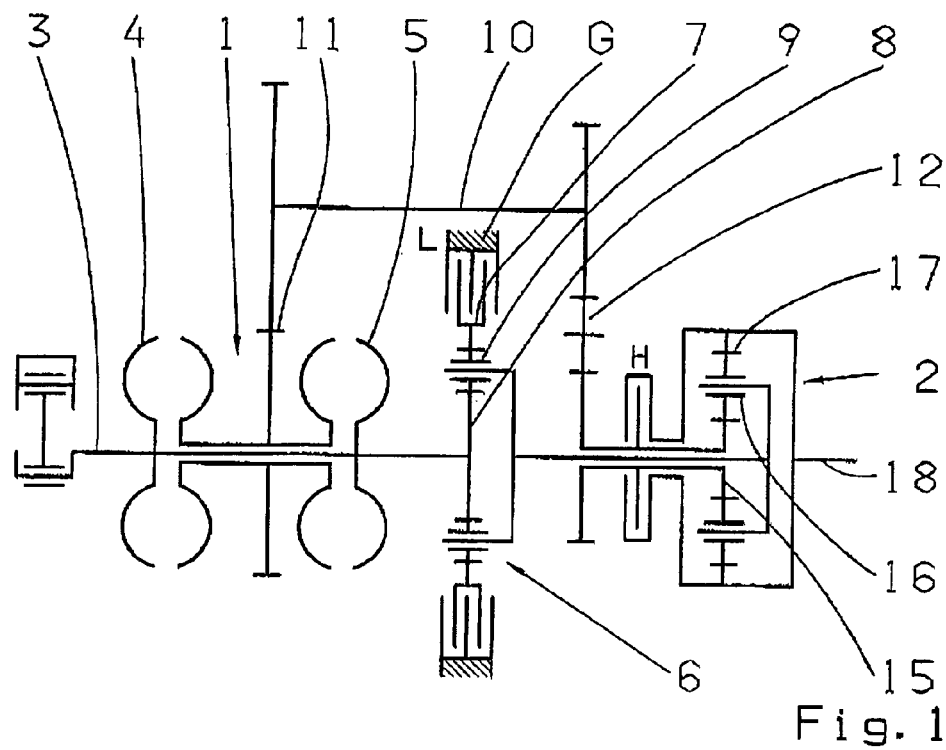
FIG. 1 shows a diagram of a first choice design of the invented split power transmission.
Figure 2:
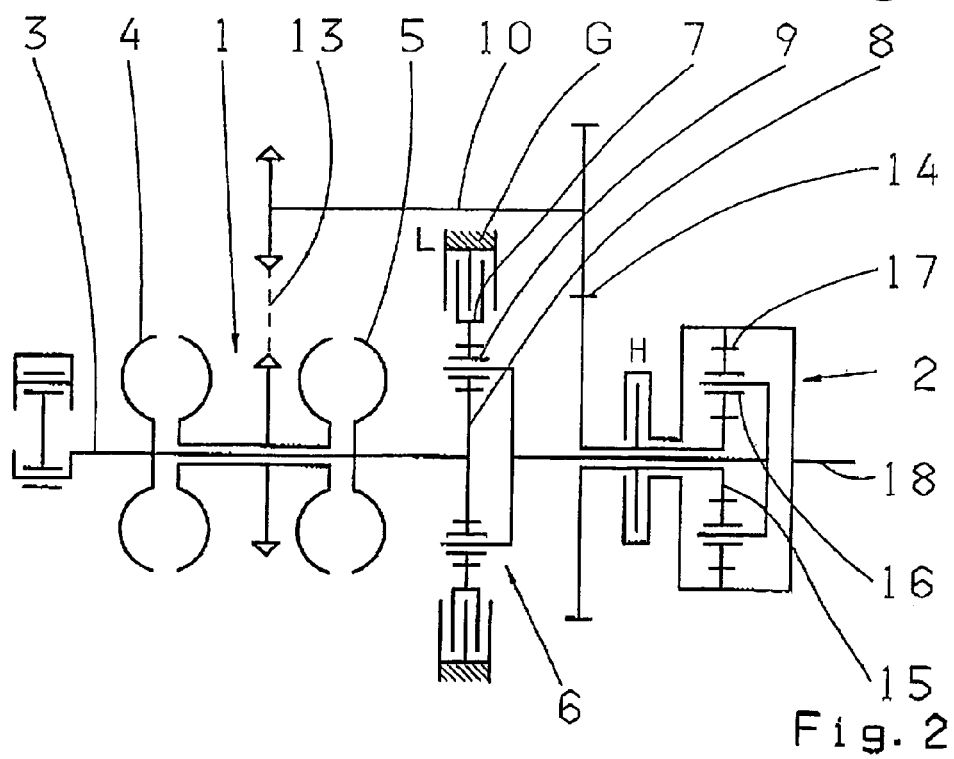
FIG. 2 shows a diagram of a second choice design of the invented split power transmission.

FIGS. 1 and 2 show a transmission including a double-tension variable drive with friction wheels 1, two variable drive disk pairs 4, 5, an integrating transmission 2 containing a planetary set 2, as well as an additional planetary set 6 positioned in the direction of the power flow. An internal (ring) gear 7 of the planetary set can be coupled via a brake L to unit (casing/housing) G. Thus, a drive shaft 3 is coupled to the variable drive 1, as well as to a sun gear 8 of the planetary set 6. The carrier of the planetary set 6 is specified as a carrier 9 and is connected to a carrier 16 of the planetary set of the integrating (summarizing) transmission 2.

In addition, the transmission contains a secondary shaft 10 positioned axially parallel to the variable drive 1. As shown in FIG. 1, the variable drive 1 power, with a defined transmission ratio, is directed via the secondary shaft 10 towards the integrating (summarizing) transmission 2 by way of a spur-gear level 11 and a second spur-gear level 12.

Alternatively, instead of the two spur-gear levels 11, 12, the transmission ratio can be realized by using a belt drive or a chain wheel drive 13, positioned between the variable drive disks 4, 5 and a spur-gear level 14 consisting of two spur gears. This configuration is shown in FIG. 2.

The integrating (summarizing) transmission 2 is positioned coaxially to the variable drive 1. As per design sample shown in FIG. 1, a sun gear 15 of the planetary set of the integrating (summarizing) transmission 2 is connected to the output of the variable drive 1 via the spur-gear level 12, the secondary shaft 10 and the spur-gear level 11. As per design sample shown in FIG. 2, the sun-gear 15 of the planetary set of the integrating (summarizing) transmission 2 is connected to the output of the variable drive 1 via the spur-gear level 14, the secondary shaft 10 and the belt drive or chain wheel drive 13. The carrier 16 of the planetary set of the integrating (summarizing) transmission 2 is connected to the carrier 9 of the planetary set 6, whereas the output of the integrating (summarizing) transmission 2 will be achieved via an internal (ring) gear 17 which can be interlocked with the sun gear by engaging a clutch H.

Provisions are made for torque divisionpower distribution In the low cruising range (LOW)—while the brake L is locked—by either transferring power from the drive shaft 3 via the sun gear B and planetary set 6, carrier 9 to carrier 16 of the planetary set of the integrating (summarizing) transmission 2 or by transferring power from the variable drive 1 via the secondary shaft 10 on to the sun gear 15 of the planetary set of the Integrating (summarizing) transmission 2. According to the invention, the total power will be transferred via the internal (ring) gear 17 on to the drive shaft 18.

In the high cruising range (HIGH), the clutch H will be engaged thus interlocking the sun gear 15 with the internal gear 17; power will be transferred from the variable drive 1 via the secondary shaft 10 on to the sun gear 15 of the planetary set of the integrating (summarizing) transmission 2 and the output is effected via the internal (ring) gear 17 in the same rotational direction as the drive.

By applying different spur-/planetary gear transmission ratios, it is possible to implement an overdrive varying between 0.2 and 0.9. While shifting within the ranges, the speed is synchronized within the effected control elements. Advantageously, there is no loss of driving power and the driving comfort is increased, therefore, shifting within the ranges can be accomplished without any change in transmission ratios. Clutch H and brake L can be designed as disc control elements or, in order to increase the effectiveness, can be designed as a dog clutch or synchronized clutch.

Of course, each constructional design, in particular each physical arrangement of the components of the invented transmission in itself and in relation to each other and insofar as they are technically sound will be covered under the protection of the present claim, without influencing the operation of the transmission, as specified in the claim, even if these designs have not been explicitly represented in the Figures or in the description.

REFERENCE NUMERALS 1 variable drive
2 integrating transmission
3 drive shaft
4 variable drive disk pair
5 variable drive disk pair
6 planetary set
7 internal gear
8 sun gear
9 link
10 secondary shaft
11 spur-gear level
12 spur-gear level
13 chain wheel drive
14 spur-gear level
15 sun gear
16 link
17 internal gear
18 drive shaft
L brake
H clutch
G unit

The invention claimed is:

1. A split power transmission including:
   a variable drive,
   a brake (L),
   a clutch (H),
   a summarizing transmission with a planetary set of which a ring gear provides a power output for the summarizing transmission,
   an additional planetary set being located in a power flow direction, between a drive shaft and the summarizing transmission, for transferring a portion of transmission drive shaft power to the summarizing transmission,
   a secondary shaft being located axially parallel to the variable drive from which power is directed to the summarizing transmission, via the secondary shaft, by using a defined transmission ratio,
   power distribution being provided in a low cruising range (LOW) by engaging the brake (L) that connects a ring gear (7) of the additional planetary set (6), with a housing (G), and
   in a high cruising range (HIGH), the clutch (H) being engaged and locking a sun gear (15) of the summarizing transmission (2) with the ring gear (17) of the summarizing transmission.

2. The split power transmission according to claim 1, wherein the additional planetary set (6) and the planetary set of the summarizing transmission (2) are both minus-planetary sets.

3. The split power transmission according to claim 1, wherein the split power transmission is a geared neutral transmission.

4. The split power transmission according to claim 1, wherein the variable drive (1) has a variable drive with friction wheels.

5. The split power transmission according to claim 1, wherein the drive shaft (3) is connected to the variable drive (1) and to a sun gear (8) of the additional planetary set (6), a carrier (9) of the additional planetary set (6) is connected with a carrier (16) of the planetary set of the integrating transmission (2) and, in the low cruising range (LOW) while the brake is engaged, power is transferred from one of the drive shaft (3), via the sun gear (8) and the carrier (9) of the additional planetary set (6), to the carrier (16) of the planetary set of the summarizing transmission (2) and from the variable drive (1), via the secondary shaft (10), to the sun gear (15) of the planetary set of the integrating transmission (2), and, in the high cruising range (HIGH), the clutch (H) is engaged, interlocking the sun gear (15) with the ring gear (17) of the planetary set of the summarizing transmission (2) and power of the variable drive (1) is transferred, via the secondary shaft (10), to the sun gear (15).

6. The split power transmission according to claim 5, wherein all power is transferred, via the ring gear (17) of the planetary set of the summarizing transmission (2), to another drive shaft (18) and, in the high cruising range (HIGH), a rotational direction of an output of the split power transmission is identical to a rotational direction of a drive.

7. The split power transmission according to claim 1, wherein one of two spur gear levels (11, 12) and a chain wheel drive (13) and pair of spur gear levels (14) is positioned in a power flow direction before and after the secondary shaft (10) so as to generate a defined variable drive power transmission ratio in the power flow direction between a variable drive output and the summarizing transmission (2).

8. The split power transmission according to claim 1, wherein the split power transmission accommodates different spur/planetary gear transmission ratios so that an overdrive, of the split power transmission, varies between 0.2 and 0.9.

9. The split power transmission according to claim 1, wherein the clutch (H) and the brake (L) are each one of disc control elements, dog clutches and synchronized clutches.

* * * * *